US010358027B2

(12) United States Patent
Gassmann et al.

(10) Patent No.: US 10,358,027 B2
(45) Date of Patent: Jul. 23, 2019

(54) SERIES OF MOUNTING SUPPORTS AND MOUNTING SUPPORT FOR FASTENING RADIATOR MODULES, AND METHOD FOR MANUFACTURING MOUNTING SUPPORTS

(71) Applicant: Volkswagen Aktiengesellschaft, Wolfsburg (DE)

(72) Inventors: Volker Gassmann, Minden (DE); Tim Kuehn, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/630,158

(22) Filed: Jun. 22, 2017

(65) Prior Publication Data

US 2017/0282704 A1    Oct. 5, 2017

Related U.S. Application Data

(63) Continuation of application No. PCT/EP2015/078544, filed on Dec. 3, 2015.

(30) Foreign Application Priority Data

Dec. 22, 2014   (DE) ..................... 10 2014 226 758

(51) Int. Cl.
*B60K 11/04*    (2006.01)
*B62D 25/08*    (2006.01)

(52) U.S. Cl.
CPC ............ *B60K 11/04* (2013.01); *B62D 25/084* (2013.01); *B60Y 2304/05* (2013.01); *B60Y 2410/122* (2013.01)

(58) Field of Classification Search
CPC .............................. B60K 11/04; B62D 25/084
See application file for complete search history.

(56) References Cited

U.S. PATENT DOCUMENTS 3,929,201 A * 12/1975 Hoffman ................ B60K 11/04
                                                                    180/68.4
4,196,774 A *  4/1980 Hoffmann .............. B60K 11/04
                                                                    165/149

(Continued)

FOREIGN PATENT DOCUMENTS

CN         100410096 C     8/2008
DE         39 43 146 A1    7/1991

(Continued)

OTHER PUBLICATIONS

Internet webpage, Oxford Dictionaries online definition of "substantially", retrieved Nov. 2, 2018, https://en.oxforddictionaries.com/definition/substantially (Year: 2018).*

*Primary Examiner* — James A Shriver, II
*Assistant Examiner* — Steve Clemmons
(74) *Attorney, Agent, or Firm* — Muncy, Geissler, Olds & Lowe, P.C.

(57) ABSTRACT

A series of mounting supports, a mounting support for fastening radiator modules and a method for producing mounting supports, in particular for motor vehicles for fastening radiator modules by which the variability of a mounting support with respect to the arrangement of radiator modules can be increased. A series of mounting supports for fastening radiator modules in the front-end structure of motor vehicles relates to mounting supports having a frame which comprises an upper transversal support, two lateral vertical supports and a lower transversal support. At least an upper bearing area and at least a lower bearing area for mounting a radiator module are formed on the frame. Adapter elements for connecting between the mounting support and a radiator module are arranged on the mounting support in the upper bearing area and/or in the lower bearing (Continued)

area, which allow the variable fastening of radiator modules in different relative positions.

13 Claims, 9 Drawing Sheets

(56) References Cited

U.S. PATENT DOCUMENTS

| | | | | |
|---|---|---|---|---|
| 4,261,151 | A * | 4/1981 | Ito | F16B 21/07 |
| | | | | 180/68.6 |
| 5,544,714 | A * | 8/1996 | May | B60K 11/04 |
| | | | | 165/67 |
| 5,558,310 | A | 9/1996 | Furuie et al. | |
| 5,996,684 | A * | 12/1999 | Clifton | B60H 1/3229 |
| | | | | 165/121 |
| 6,412,581 | B2 * | 7/2002 | Enomoto | B60K 11/04 |
| | | | | 165/69 |
| 6,450,276 | B1 * | 9/2002 | Latcau | B62D 25/084 |
| | | | | 180/68.1 |
| 6,571,898 | B2 * | 6/2003 | Guyomard | B60K 11/04 |
| | | | | 165/69 |
| 6,827,129 | B2 * | 12/2004 | Ozawa | B60K 11/04 |
| | | | | 165/140 |
| 6,869,131 | B2 * | 3/2005 | Kafuku | B62D 25/084 |
| | | | | 180/68.4 |
| 7,036,617 | B2 * | 5/2006 | Harada | B60K 11/04 |
| | | | | 180/68.4 |
| 7,886,860 | B2 | 2/2011 | Spieth et al. | |
| 8,210,298 | B2 * | 7/2012 | Hemmersmeier | F28F 9/002 |
| | | | | 180/68.4 |
| 9,261,011 | B2 | 2/2016 | Keerl | |
| 2004/0200598 | A1 | 10/2004 | Hitt et al. | |
| 2006/0213639 | A1 * | 9/2006 | Kobayashi | B60K 11/04 |
| | | | | 165/67 |
| 2010/0078149 | A1 * | 4/2010 | Yoshimitsu | B60K 11/04 |
| | | | | 165/67 |

FOREIGN PATENT DOCUMENTS

| | | |
|---|---|---|
| DE | 103 16 614 A1 | 11/2004 |
| DE | 602 05 121 T2 | 5/2006 |
| DE | 10 2006 009 902 A1 | 9/2007 |
| DE | 10 2008 051 394 A1 | 5/2010 |
| DE | 10 2004 043 354 B4 | 6/2010 |
| DE | 10 2009 051 530 A1 | 5/2011 |
| DE | 10 2009 056 508 A1 | 6/2011 |
| DE | 10 2010 001 783 A1 | 8/2011 |
| DE | 10 2012 019 443 A1 | 4/2014 |
| EP | 1 072 501 A2 | 1/2001 |
| EP | 1 413 501 A1 | 4/2004 |
| EP | 1 650 521 A1 | 4/2006 |
| EP | 1 726 470 A1 | 11/2006 |
| EP | 2 080 690 A1 | 7/2009 |
| EP | 1 829 768 B1 | 8/2009 |
| EP | 1 910 157 B1 | 3/2012 |
| FR | 2 820 710 A1 | 8/2002 |
| JP | H08-53013 A | 2/1996 |
| JP | 2001-150962 A | 6/2001 |
| JP | 2008-068689 A | 3/2008 |
| KR | 10-2011-0032027 | 3/2011 |
| WO | WO-2009153023 A1 * | 12/2009 ............ B62D 21/152 |

* cited by examiner

SERIES OF MOUNTING SUPPORTS AND MOUNTING SUPPORT FOR FASTENING RADIATOR MODULES, AND METHOD FOR MANUFACTURING MOUNTING SUPPORTS

This nonprovisional application is a continuation of International Application No. PCT/EP2015/078544, which was filed on Dec. 3, 2015, and which claims priority to German Patent Application No. 10 2014 226 758.7, which was filed in Germany on Dec. 22, 2014, and which are both herein incorporated by reference.

BACKGROUND OF THE INVENTION

Field of the Invention

The present invention relates to a series of mounting supports as well as a mounting support for fastening radiator modules and a method for manufacturing mounting supports, in particular for motor vehicles.

Description of the Background Art

The manufacture of mounting supports in assemblies as series of mounting supports is known from DE 10 2006 009 902 A1 and EP 1 829 768 B1, according to which different variants of upper parts, which are used as upper cross members, are combined with a single lower part. Depending on the type of motor vehicle, a suitable variant of an upper part is to be combined with and joined to the lower part to obtain a suitable mounting support.

A radiator module and an adapter pair for holding radiator and frame components of a radiator module are known from DE 10 2009 056 508 A1,which are intended to facilitate a conversion of a motor vehicle having an internal combustion engine drive to a drive without an internal combustion engine. In this radiator module, a radiator or frame component is fastened in front of or behind an adapter pair without clearance, and a clearance is left between two adapter elements of the adapter pair which may be arranged on the side of the radiator module. The element, which is not described in detail and is referred to as a condenser frame, may be viewed as a mounting support in this radiator module.

An arrangement of a radiator element on a mounting support is known from DE 10 2004 043 354 B4, which is intended to simplify the mounting and removal of the mounting support and radiator element by using intermediate holders which are arranged as separate elements between the mounting support and the radiator element. The intermediate holders each have a fastening eye for the form-fitting accommodation of an elastically deformable bushing as well as at least one retaining finger, which is detachably connected to the mounting support.

SUMMARY OF THE INVENTION

It is therefore an object of the invention to provide a series of mounting supports as well as a mounting support for fastening radiator modules and a method for manufacturing mounting supports, with the aid of which the variability of a mounting support with respect to the arrangement of radiator modules may be increased. In particular, an easy and cost-effective way to use a mounting support for different radiator modules is to be provided.

A series of mounting supports according to an exemplary embodiment of the invention is used to fasten radiator modules in the front end of motor vehicles. The mounting support comprises a frame, which includes an upper cross member, two lateral vertical members and a lower cross member, at least one upper bearing area and at least one lower bearing area being formed on the frame for mounting a radiator module. Adapter elements are furthermore arranged or formed on the mounting support in the upper bearing area and/or in the lower bearing area for establishing a connection between the mounting support and a radiator module, which facilitate a fastening of radiator modules in different relative positions to the mounting support. The at least one upper bearing area mentioned above is situated, in particular, in the area of a vertical member of the frame. The aforementioned lower bearing area is situated, in particular, in the area of the lower cross member of the frame. A mounting in the sense of the series of mounting supports according to the invention can be understood to be a direct mounting, in which an element of the radiator module, in particular a connecting pin, engages with an element of the frame and is thus accommodated by the frame itself. However, this is also intended to include an indirect mounting, in which an element of the radiator module, in particular a connecting pin, is inserted into a connecting element, in particular a bearing element arranged in a bearing housing, the bearing housing being connected to the frame of the mounting support as an intermediate element. In the present case, adapter elements within the meaning of the invention can be understood to be elements which are integrally formed or arranged in the mounting support of a series of mounting supports according to the invention as well as those adapter elements which are provided in different configurations and are connectable to the frame of a mounting support and facilitate a variable relative position between the radiator module and the mounting support, due to their design. In the present case, different relative positions of the radiator module to the mounting support, which differ in terms of their relative position, in particular in the longitudinal direction, are meant by different relative positions. These relative positions may be selected for radiator modules of different thicknesses (extension in the vehicle longitudinal direction), in particular in such a way that the backs of all radiator modules have the same orientation toward the mounting support in the vehicle longitudinal direction (x direction). The invention was effectuated against the background that differently dimensioned mounting supports currently exist for different vehicles and different vehicle equipment packages, some of which may be combined with the same radiator modules and others with different radiator modules in terms of their dimensions (in particular in terms of their thickness, due to a different number of radiator layers). With the aid of a series of mounting supports according to the invention, the number of mounting supports required may be reduced by making it possible to use of one mounting support for different radiator modules.

In an embodiment of a series of mounting supports according to the invention, separately manufactured elements are provided as adapter elements, which are connected to the mounting support in a form-fitting, force-fitting and/or integral manner. In this regard, reference is made, in particular, to the possibility of manufacturing adapter elements from unreinforced plastic, from a fiber-reinforced plastic or from a metallic material, which, prior to the manufacture of a mounting support by injection molding, is placed in the injection mold of the mounting support and overmolded with plastic for the purpose of becoming an integral part of the plastic injection-molded part. Reference is furthermore made to the possibility of separately manufacturing an adapter element, produced as outlined above, and a mounting support and subsequently fixedly connecting them to each other by means of clips, screwing, riveting or in another suitable manner. The adapter element can be limited in size to the upper bearing area and/or the lower bearing area, in particular if the adapter element is a separately manufactured element, since in this case the frame of the mounting support is only slightly or even insignificantly weakened in its flexural rigidity by a section which may be provided for arranging the adapter element.

In an embodiment of a series of mounting supports according to the invention, radiator bearings of different lengths, which are connectable to the mounting support, are provided as adapter elements to facilitate different relative positions between the mounting support and the radiator modules. In this regard, reference is made, in particular, to radiator bearing housings, which are used as adapter elements and which have radiator bearing elements arranged within the radiator bearing housing. Radiator bearing housings of this type may be used to quickly and cost-effectively establish connections between radiator modules and mounting supports, in particular in the upper bearing area.

In an embodiment of a series of mounting supports according to the invention, radiator bearings having at least two bearing receiving openings and/or different radiator bearings having different bearing receiving opening arrangements, which are connectable to the mounting support, are provided as adapter elements for different arrangements. The addressed bearing receiving openings are to be suitable, in particular, for accommodating bearing bolts projecting from a housing of a radiator module laterally, or upwardly or downwardly. With regard to a radiator bearing having at least two bearing receiving openings, reference is made, in particular, to elongated lower bearing areas, into which the connecting bolts of a radiator module are usually inserted first during the mounting of a radiator module on a mounting support. In an embodiment of a series of mounting supports according to the invention, radiator bearings of this type may, for example, have two or more openings for accommodating a connecting bolt in different positions, in particular in positions which differ in the longitudinal direction. With regard to the radiator bearings having different bearing receiving opening arrangements, reference is made, for example, to upper bearing areas having openings for accommodating flexurally elastic latching tabs of bearing housings, in particular to form clip connections between a bearing housing and a mounting support. Bearing housings of this type may have an elongated shape as adapter elements, which make it possible to arrange a fixed element in different positions within the bearing housing, in particular in different positions with regard to the longitudinal direction of the motor vehicle.

In the present case, "elongated" in connection with a bearing area or a radiator bearing can be understood to be, for example, those bearing areas or radiator bearings which have a length of at least 50 mm. In an embodiment of a series of mounting supports according to the invention, the radiator bearings used as an adapter element have a length of at least 50 mm in the upper bearing area and/or in the lower bearing area. The length of an adapter element can be at least 60 mm and particularly preferably at least 70 mm. The length of the bearing areas can be more than twice the thickness of a radiator layer and can be in the range between 3 times and 6 times the thickness of a radiator layer. The thickness of a radiator layer may be, for example, 15 to 40 mm, in particular 20 to 30 mm. With the aid of adapter elements of this type, two or more bearing receiving opening arrangements may be implemented within the same bearing element regardless of whether these bearing receiving opening arrangements are implemented simultaneously on all elements or whether a selection of one or multiple bearing receiving opening arrangements is defined during the manufacture of a radiator bearing used as an adapter element.

In an embodiment of a series of mounting supports according to the invention, at least one indentation is formed in the lower cross member of the frame of a mounting support for accommodating a radiator bearing used as an adapter. In the present case, an indentation can be understood to be, in particular, a material recess in the frame of the mounting support. However, areas which are delimited by walls extending in the vertical direction and which are suitable for arranging a radiator bearing made from an elastic material are also to be viewed as an indentation, the radiator bearing being intended to be fixed in its position by the force of gravity and/or by a clamping force applied to the radiator bearing by the lateral delimiting walls of the indentation. In another practical specific embodiment, an indentation as described above has at least one constriction, in particular if the indentation has a length of at least 50 mm. This can be understood to be, in particular, a tapering. This constriction is preferably arranged in such a way that it results in an improved absorption of the longitudinal forces acting upon the radiator bearing, in that the radiator bearing is able to be at least partially supported against a complementarily formed wall of the indentation, due to the constriction.

If the at least one adapter element is arranged to at least partially overlap a vertical member of the mounting support when viewed in the vehicle vertical direction and in the vehicle transverse direction, this results in an integral arrangement of the adapter element within the mounting support, which is advantageous, in particular, with regard to the necessary space requirements of a series of mounting supports according to the invention. In particular, no additional mounting space is required for changing over production from mounting supports known from the prior art to a series of mounting supports according to the invention.

Some variants of the series of mounting supports according to the invention are apparent not only by the relative arrangement of radiator bearings and/or a radiator module with respect to a mounting support but are also apparent exclusively by the design of a mounting support—regardless of additional elements. Patent protection is thus also claimed independently for mounting supports of this type. A mounting support according to the invention for fastening a radiator module comprises a frame, which includes an upper cross member, two lateral vertical members and a lower cross member, at least one upper bearing area for mounting a radiator module and at least one lower bearing area for mounting a radiator module being formed on the frame. The at least one upper bearing area and/or the at least one lower bearing area are formed in the frame as a removable adapter element of the frame. Protection is therefore also sought for mounting supports which have adapter elements designed as separate elements, in particular in the area of the vertical member. These can also be understood to be adapter elements which are provided in the form of bearing housings having integrated bearing elements for establishing a clip connection with bearing elements. The invention was effectuated, in particular, for mounting supports in which a first upper bearing area and a second upper bearing area are arranged or formed in the vertical members, and/or a first lower bearing area and a second lower bearing area are formed in the lower cross member. A radiator module is usually mounted in these mounting supports, in that two lower connecting bolts are first inserted into recesses of lower radiator bearings, which are positioned in the lower cross member of the mounting support. Two bearing housings having integrated bearing elements, which are mounted on connecting bolts projecting laterally from the radiator module, are then fixed in the mounting support with the aid of a clip connection.

In an embodiment of a mounting support according to the invention, the upper cross member can be manufactured as a separate element and can form a first part of the frame, the vertical members and the lower cross member forming a second part of the frame. In this embodiment, the second part can be connectable to the first part in at least two different positions, and/or is arranged to be movable relative to the first part in the longitudinal direction, viewed in the longitudinal direction of the vehicle. This embodiment and the embodiment described above are based on the shared inventive idea of variably providing the relative arrangement of radiator modules within a mounting support in the longitudinal direction with the aid of an adapter in particular with respect to the relative position between the mounting support and the radiator module. In this regard, the variable arrangeability or movability in the longitudinal direction may also be viewed as an adapter approach relating to the arrangement of radiator modules in the longitudinal direction. A variable arrangeability between the second part and the first part may be implemented, in particular, in that pins extending in the vertical direction of the vehicle and corresponding openings can be formed on the first part and/or in the second part, which are aligned with each other in different relative positions, and additional openings for rivet or screw connections are formed in different constellations.

The invention also relates to a method for manufacturing mounting supports for fastening radiator modules to a frame, which comprises an upper cross member, two lateral vertical members on the sides of the cross members, and a lower cross member, at least one upper bearing area for mounting a radiator module and at least one lower bearing area for indirectly mounting or directly mounting a radiator module being formed on the frame, and the manufacture taking place by plastic injection molding using a mold. According to the method according to the invention, the use of an interchangeable mold insert system having at least two mold inserts is provided in the area of the at least one upper bearing area, different upper bearing areas being producible on the otherwise identical mounting support by selecting a suitable mold insert with the same mold. The method according to the invention has the advantage that different mounting support configurations, which differ only by a different formation of an adapter element in the upper bearing area, may be provided with the aid of only one plastic injection mold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
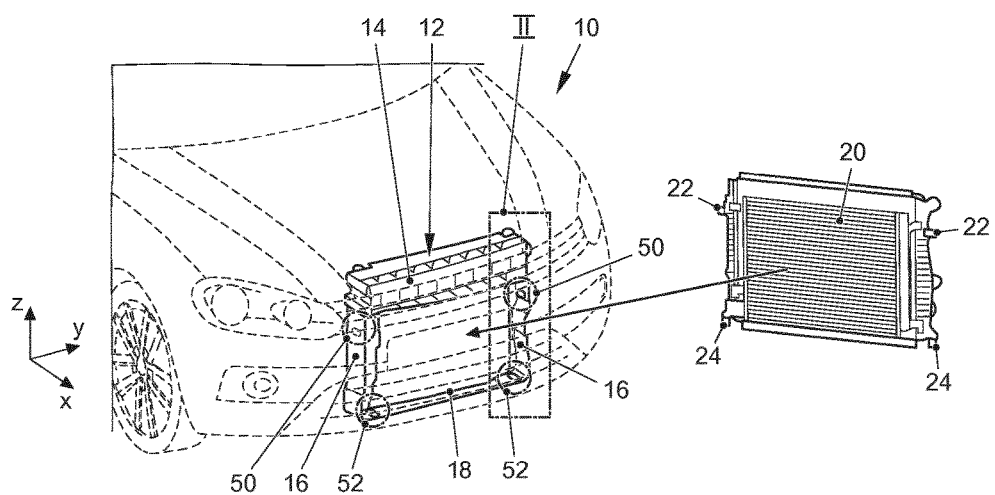
FIG. 1 shows a representation of a front end of a motor vehicle, including a mounting support and a radiator module to be inserted into the mounting support, in an oblique view from the front.

FIG. 1 shows a front end of a motor vehicle 10, including a mounting support 12, which is designed as a frame having an upper cross member 14, two lateral vertical members 16 and a lower cross member 18. Mounting support 12 is used to accommodate and fasten a radiator module 20, which is illustrated separately in FIG. 1. Radiator module 20 has two laterally projecting connecting pins 22 in the upper area and downwardly projecting connecting pins 24 in the lower area, laterally projecting connecting pins 22 being provided for connection to mounting support 12 in an upper bearing area 50, and downwardly projecting connecting pins 24 being provided for connection to the mounting support in a lower bearing area 52.

Figures 2A, 2B, 2C:
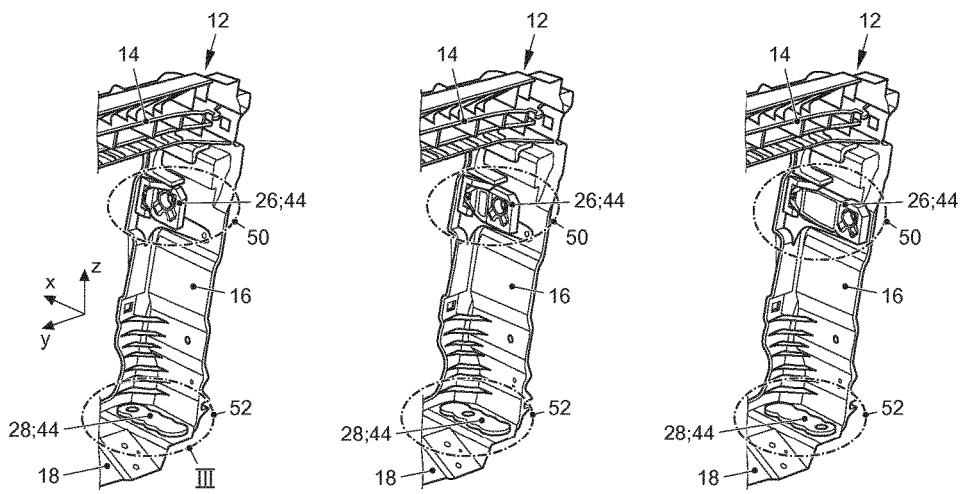
FIGS. 2(a)-2(c) show different radiator bearing arrangements in the area marked II in FIG. 1 according to a first specific embodiment of a series of mounting supports according to the invention.

FIG. 2 shows an enlarged representation of the area of left vertical member 16 marked II in FIG. 1, viewed in the direction of travel. The opposite side having right vertical member 16, which is not illustrated, has a similar design. It is apparent that, in variants a), b) and c) different specific embodiments of upper radiator bearings 26 in upper bearing area 50 and different specific embodiments of lower radiator bearings 28 in lower bearing area 54 are connected to mounting support 12 in vertical member 16. Upper radiator bearings 26 and lower radiator bearings 28 are used as adapter elements 44 within the meaning of the invention. Upper radiator bearings 26 are connected to mounting support 12 with the aid of a clip connection. Lower radiator bearings 28 are inserted into an indentation formed in mounting bearing 12 and held in place by a clamping force acting between lower radiator bearing 28 and the walls of the indentations formed in mounting support 12 and the force of gravity, due to their complementary shape with respect to the opening.

Additional details of bearing elements 26, 28 are illustrated below in connection with FIGS. 3 and 4, FIGS. 3a through c) showing enlarged representations of lower radiator bearings 28 illustrated in FIG. 2, and FIGS. 4a) through c) showing enlarged illustrations of upper radiator bearings 26 illustrated in FIG. 2.

Figure 3A:
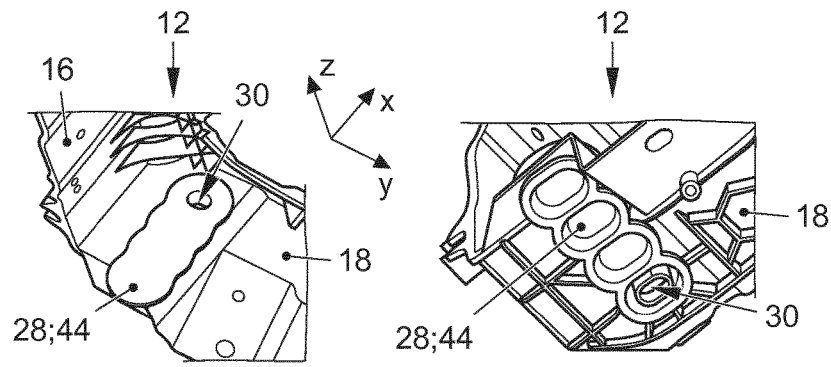
FIGS. 3(a)-3(c) show detailed representations of the areas marked III in FIGS. 2a) through c) in a perspective view from above (left representation) and in a perspective view from below (right representation)
Figure 3B:
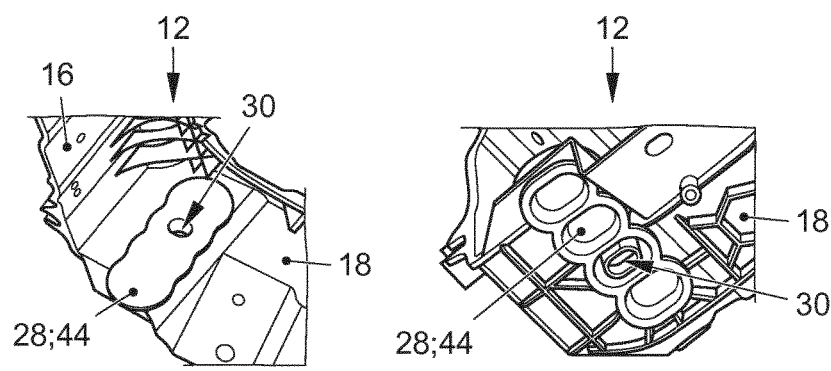
Figure 3C:
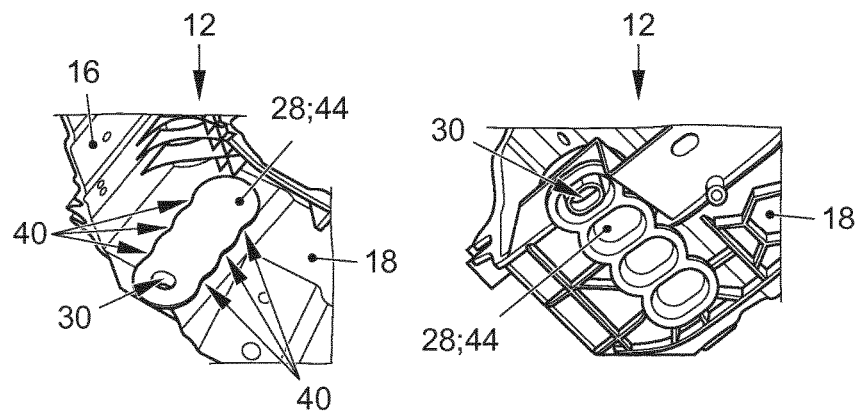

It is clearly apparent in FIGS. 3a through c) that each of illustrated lower radiator bearings 28 has a bearing receiving opening 30 for lower connecting pins 24 of a radiator module 20. In the three illustrated variants a) through c), bearing receiving openings 30 are each arranged in different positions in the vehicle longitudinal direction (x direction). Bearing receiving openings 30 themselves extend in the vehicle vertical direction (z direction).

Lower radiator bearings 28 shown in FIG. 3 have a length of approximately 120 mm in the x direction. The distance between openings 30 in the arrangement illustrated in FIGS. 3a) and 3b) is 25 mm; the distance between bearing openings 30 in the arrangement illustrated in FIGS. 3a) and 3c) is 75 mm FIG. 4 shows different upper radiator bearings 26, which comprise a bearing housing 32 and a bearing element 34 arranged within bearing housing 32, bearing element 34 being manufactured from an elastic material and having a bearing receiving opening 36. It is also apparent in FIGS. 4a) through c) that bearing housing 32 has two flexurally elastic latching elements 38 on its front side, which make it possible to establish a clip connection between bearing housing 32 and a mounting support 12 as illustrated in FIG. 1. As is apparent in FIGS. 4a) through c), the distance from a connecting point on a mounting support 12 as illustrated in FIG. 1 to a bearing receiving opening 36 may be varied by using upper radiator bearings 26 of different lengths. The distance is increased by 25 mm in the variant illustrated in FIG. 4b) compared to the variant from FIG. 4a). In the variant illustrated in FIG. 4c), the distance is increased by 75 mm over the variant illustrated in FIG. 4a). The distances thus correspond to the distances of bearing receiving openings 30 in lower radiator bearings 28 illustrated in FIGS. 3a) through c). In the illustrated specific embodiment, the dimension of 25 mm corresponds to the thickness of one radiator layer. Radiator bearings 26, 28 illustrated in FIGS. 2a), 3a) and 4a) are thus suitable for radiator modules having one radiator layer, those illustrated in FIGS. 2b, 3b) and 4b) are suitable for radiator modules 20 having two radiator layers and those illustrated in FIGS. 2c), 3c) and 4c) are suitable for radiator modules 20 having four radiator layers. Radiator bearings 26, 28 may be adapted accordingly for radiator modules 20 having other dimensions or another number of radiator layers.

Figure 4A:
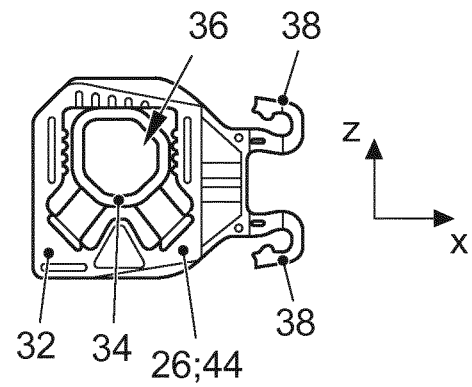
FIGS. 4(a)-4(c) show enlarged representations of the upper radiator bearing housing illustrated in FIG. 2.
Figure 4B:
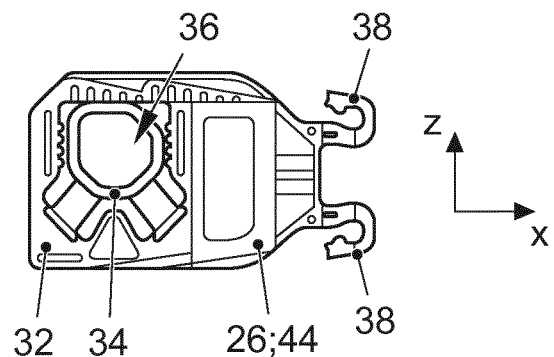
Figure 4C:
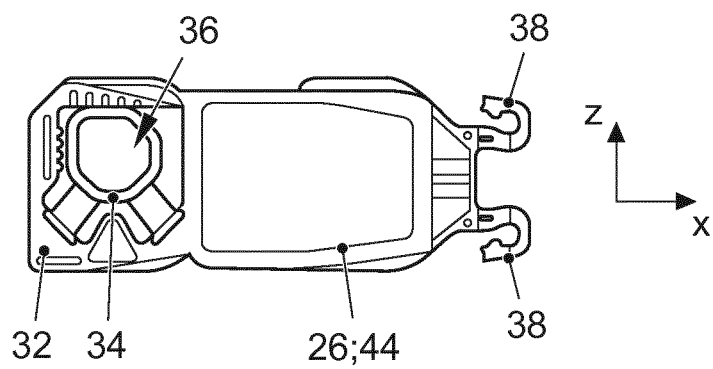
Figure 5:
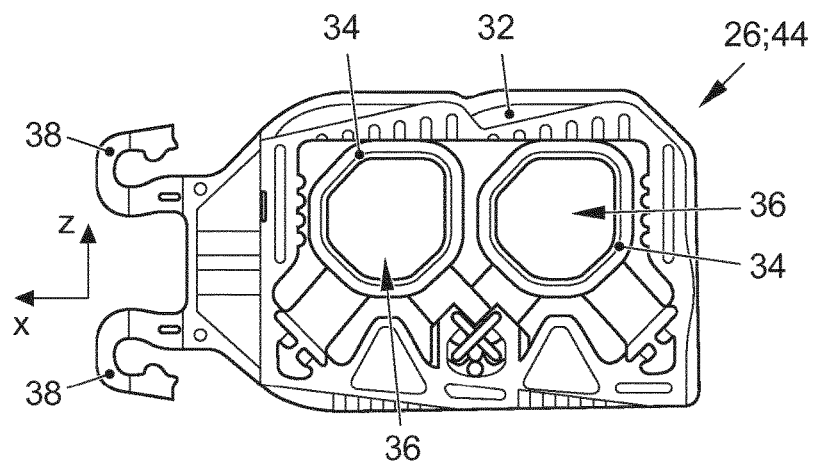
FIG. 5 shows an embodiment of a radiator bearing housing, including different possibilities for arranging bearing elements within the housing.

FIG. 5 shows another specific embodiment of an upper radiator bearing 26 used as an adapter element 44, which includes a bearing housing 32 and bearing elements 34 fixed in housing 32, whose geometry essentially correspond to the specific embodiments illustrated in FIGS. 4a) through c).

Based on the specific embodiment of an upper radiator bearing 26 illustrated in FIG. 5, it is apparent that bearing housing 32 may be provided with an elongated design in such a way that different arrangements of bearing elements 34 are possible within bearing housing 32. Arrangements of this type may be selected simultaneously or alternatively, i.e., either only one bearing element 34 may be arranged in a selected position in bearing housing 32 or two or more bearing elements 34 may be arranged simultaneously in bearing housing 32. The provision of only one arrangement has the advantage that only material actually needed to manufacture an upper radiator bearing 26 of this type is used. In this case, an incorrect use of an upper radiator bearing 26 of this type (e.g. by inserted a connecting pin into an incorrect bearing receiving opening 36) is also ruled out, since in this case only one bearing receiving opening 36 is available for accommodating a connecting pin 22 (according to FIG. 1) of a radiator module 20. The simultaneous implementation of the arrangement of two or more bearing elements 34 in a housing 32 of an upper radiator bearing 26 has the advantage that the number of equivalent parts may be increased. This may also lead to cost savings, in particular if the capacity of a production machine may be utilized more efficiently thereby and/or if the procurement or procedures for retrofitting a second production machine may be spared.

Figure 6:
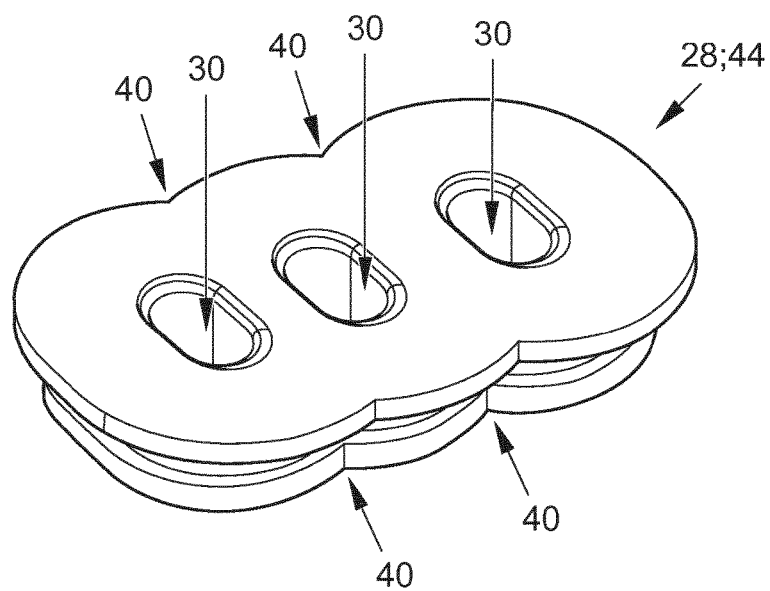
FIG. 6 shows an embodiment of a lower radiator bearing having multiple bearing receiving openings.

FIG. 6 shows an alternative specific embodiment of a lower radiator bearing 28, whose geometry essentially corresponds to that of lower radiator bearings 28 illustrated in FIGS. 3a) through c). Deviating from the specific embodiments illustrated in FIGS. 3a) through c), lower radiator bearing 28 shown in FIG. 6 has three bearing receiving openings 30, which different in terms of their positions in the x direction in the state inserted in mounting support 12 as illustrated in FIG. 1.

It is also clearly apparent in FIG. 6 that lower radiator bearing 28 has a total of two constrictions 40 formed on both sides, viewed in its longitudinal direction. Constrictions 40 are each situated in an area between two bearing receiving openings 30. They result in the fact that forces transmitted to lower radiator bearing 28 via a lower connecting pin 24 (according to FIG. 1) of radiator module 20 in the longitudinal direction experience a high resistance force through radiator bearing 28, since the walls of the indentation surrounding bearing element 34 are not made of elastic plastic material in the area of constrictions 40 in mounting support 12 illustrated in FIG. 1 and thus act as counter bearings.

Figure 7:
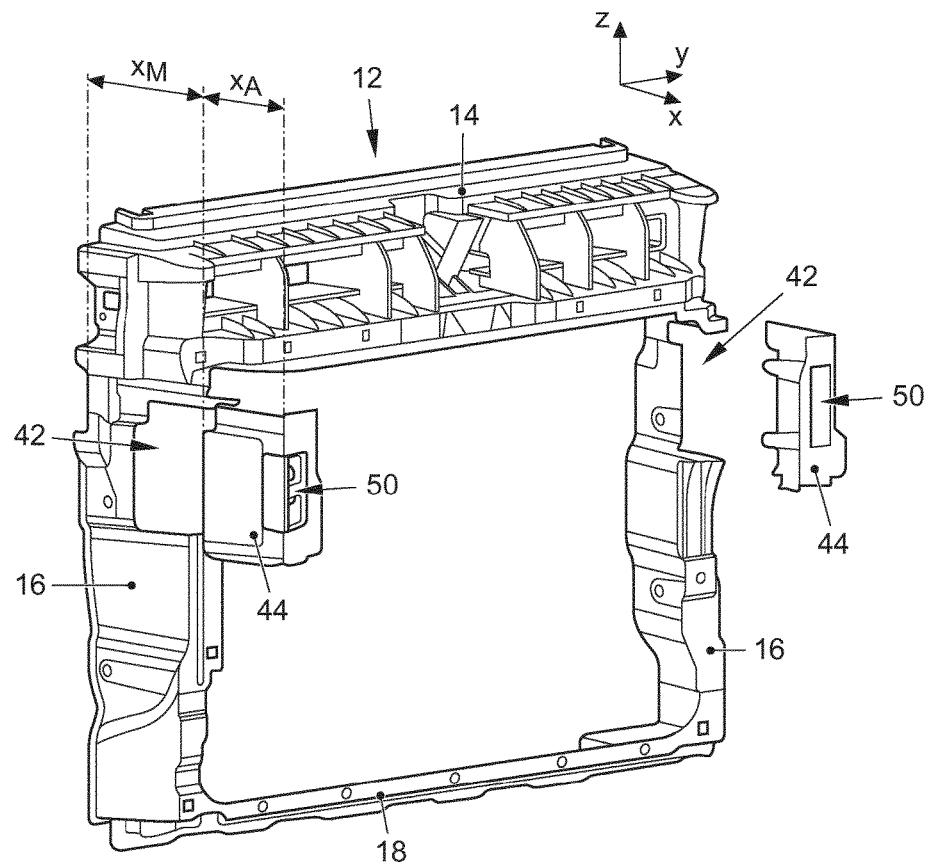
FIG. 7 shows a mounting support, including a schematic representation of two additional specific embodiments with variable adapter elements.

FIG. 7 shows another specific embodiment of a mounting support 12 according to the invention in a schematic representation. The schematic representation serves to visualize two different concepts. Regardless of the selection of the concept, a recess 42 for an adapter element 44 is provided in mounting support 12 in the area of vertical member 16 on the left and right sides. Adapter element 44 is a variably usable element, which is connected to mounting support 12 in a form-fitting, force-fitting and/or integral manner.

According to a first concept (fully integrated adapter element), adapter element 44 is an element which is variable in terms of its geometry and which is formed as a single piece with mounting support 12, in particular by means of plastic injection molding, during the manufacture of mounting support 12. In this case, adapter element 44 is formed as a single piece with mounting support 12 and thus as part of mounting support 12 itself. For this purpose, an interchangeable mold insert system, which includes at least two mold inserts, is preferably used to select a suitable geometry for adapter element 44. In this respect, the invention applies only to series of mounting supports in which different geometries are formed in the area of upper bearing areas 50 as partial areas of a mounting support 12 designed as a frame, which includes an upper cross member 14, two lateral vertical members 16 and a lower cross member 18, and these mounting supports 12 are manufactured using only one mold. Adapter element 44 preferably extends over only one partial area of longitudinal extension $X_M$ of mounting support 12 in upper bearing area 50, i.e., the frame formed from upper cross member 14, lateral vertical members 16 and lower cross member 18 is also not interrupted in the area of upper bearing area 50. In the specific embodiment illustrated in FIG. 7, the length of adapter element 44 is $X_A$ in the x direction and is less than length $X_M$ of mounting support 12 with adapter element 44 inserted.

According to a second concept, adapter element 44 is a separately manufactured element, which is inserted into a plastic injection mold prior to the manufacture of a mounting support 12 and may be overmolded with plastic. Alternatively, adapter element 44 manufactured as a separate element may also be designed in such a way that it may be connected to mounting support 12 later on, in particular by screwing, riveting, welding, with the aid of a clip connection or in another suitable manner. In this concept, adapter element 44 is apparent either directly as a separate element, or it may be made apparent at least by means of a detailed examination of a mounting frame 12 (e.g. destruction (separation) in the area of upper bearing area 50).

In both the first concept and the second concept described above, lengths $X_A$ of adapter elements 44 may be adapted to the thickness and number of the radiator layers of a radiator module 20 to be accommodated by mounting support 12.

Figure 8:
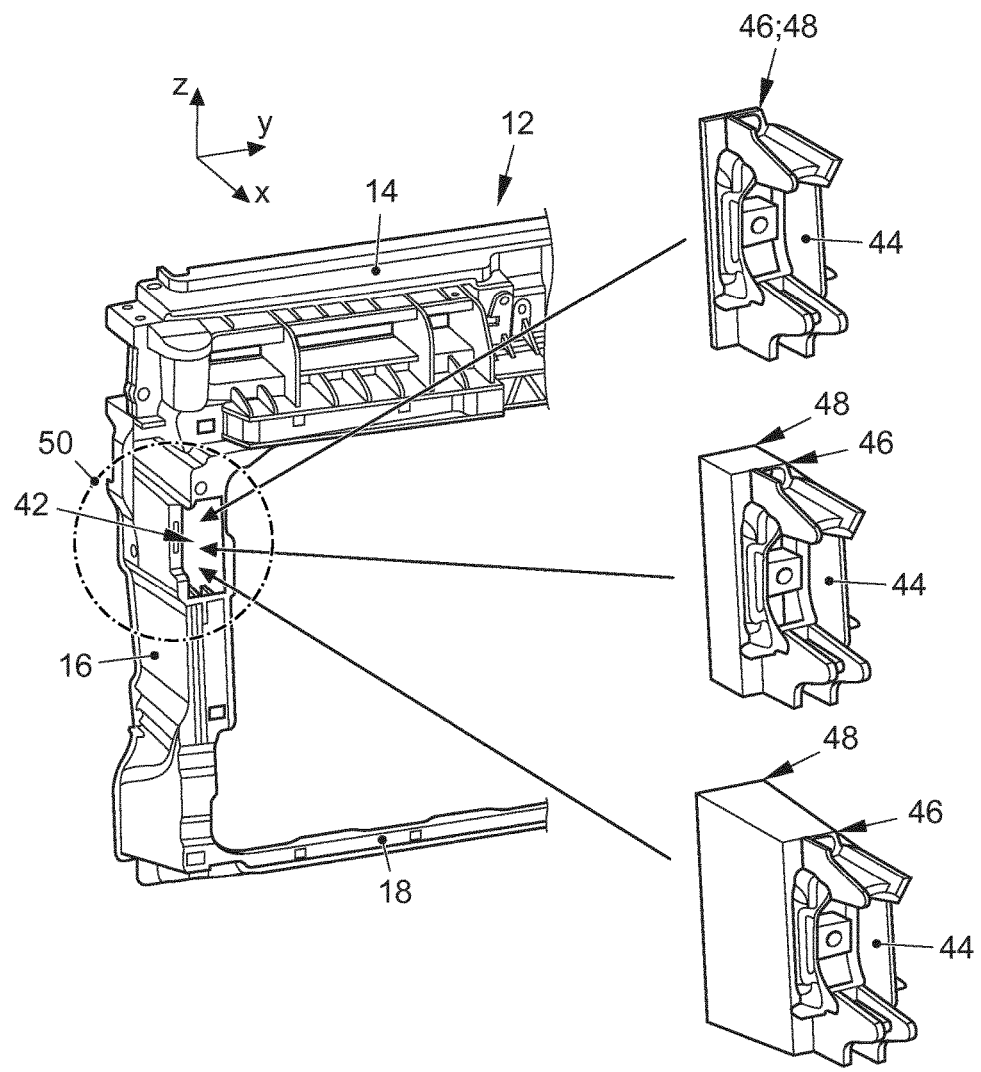
FIG. 8 shows an embodiment of a mounting support, including variable adapter elements within the mounting support.
Figure 9A:
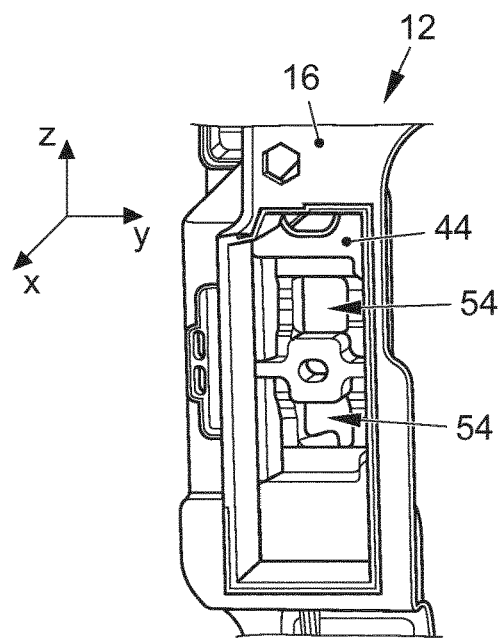
FIGS. 9(a) and 9(b) show detailed representations of the mounting support illustrated in FIG. 8, including the inserted adapter element in a view from the front (FIG. 9a) and in an oblique view from the rear (FIG. 9b)
Figure 9B:
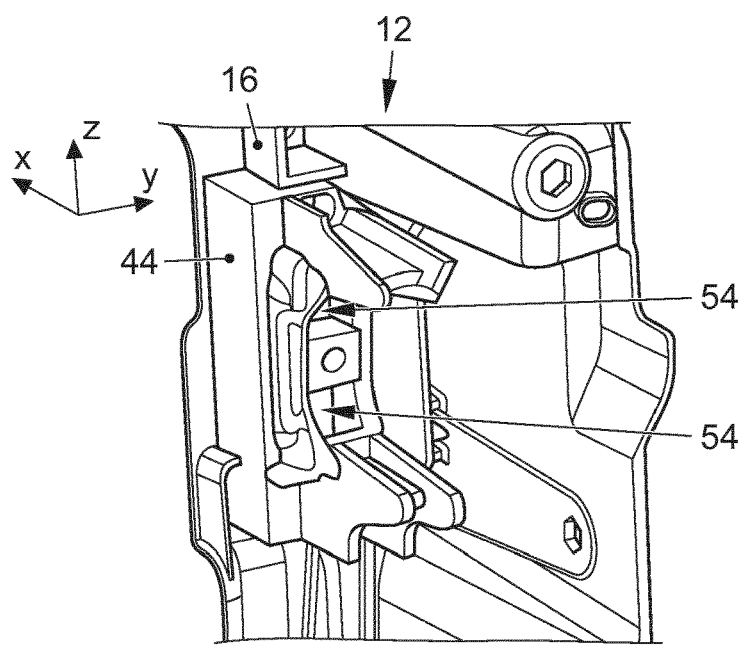

Another specific embodiment similar to the specific embodiment described above in connection with FIG. 7 is illustrated in FIGS. 8, 9a) and 9b). In these illustrations, FIG. 8 visualizes that adapter elements 44, which have different designs in terms of their geometry, are insertable into a recess 42 of a mounting support 12 in an upper bearing area 50. The three adapter elements 44 illustrated in FIG. 8 differ from each other by the distance of plane 46 used as the connecting plane for an upper radiator bearing (not illustrated) from front edge 48 of adapter element 44. Due to a variation of the geometry of adapter element 44 illustrated in FIG. 8, the relative position of a radiator module 20 relative to a mounting support 12 may be varied. A variation of this type may take place alternatively or in addition to a variation of the arrangement according to the possibility illustrated in FIGS. 2, 4 and 5. It should be noted that separately illustrated adapter element 44 is shown from the rear in FIG. 8, while mounting support 12 is illustrated from the front. FIGS. 9a) and 9b) show mounting support 12 and middle adapter element 44 from FIG. 8, positioned relative to each other and oriented correctly in a view from the front (FIG. 9a)) and in a view from the rear (FIG. 9b)).

Adapter element 44 illustrated in the middle in FIG. 8 is shown in FIG. 9 from two different perspectives in a state inserted into mounting support 12. The two apparent openings 54 are used to accommodate latching elements 38, in particular those as illustrated in FIG. 4 in connection with different upper radiator bearings 26.

In the exemplary embodiment illustrated in FIGS. 8 and 9, the variation in the length of the adapter elements in the x direction, i.e. the difference between plane 46 and front edge 48 in the middle and lower examples from FIG. 8, also corresponds to an integral multiple of the thickness of one radiator layer. Upper adapter element 44 from FIG. 8 is provided for a radiator module 20 having one radiator layer, middle adapter element 44 is provided for a radiator module 20 having two radiator layers and lower adapter element 44 is provided for a radiator module 20 having four radiator layers. It was thus constructed similarly to the exemplary embodiments described above.

In all specific embodiments of series of mounting supports according to the invention described in FIGS. 1 through 9, adapter elements 44 extend over only a partial area of vertical members 16 and/or lower cross member 18, in particular over less than 50 percent of the height of vertical member 16 and/or the width of lower cross member 18. Adapter elements 44 preferably extend only over the functional upper bearing area 50 or lower bearing area 52, which generally makes up less than 20 percent, usually even less than 10 percent, of the height or width specified above. Adapter element 44 is furthermore arranged entirely or almost entirely within mounting support 12, i.e. it does not project over mounting support 12, in particular in the longitudinal direction and/or in the vertical direction.

Figure 10:
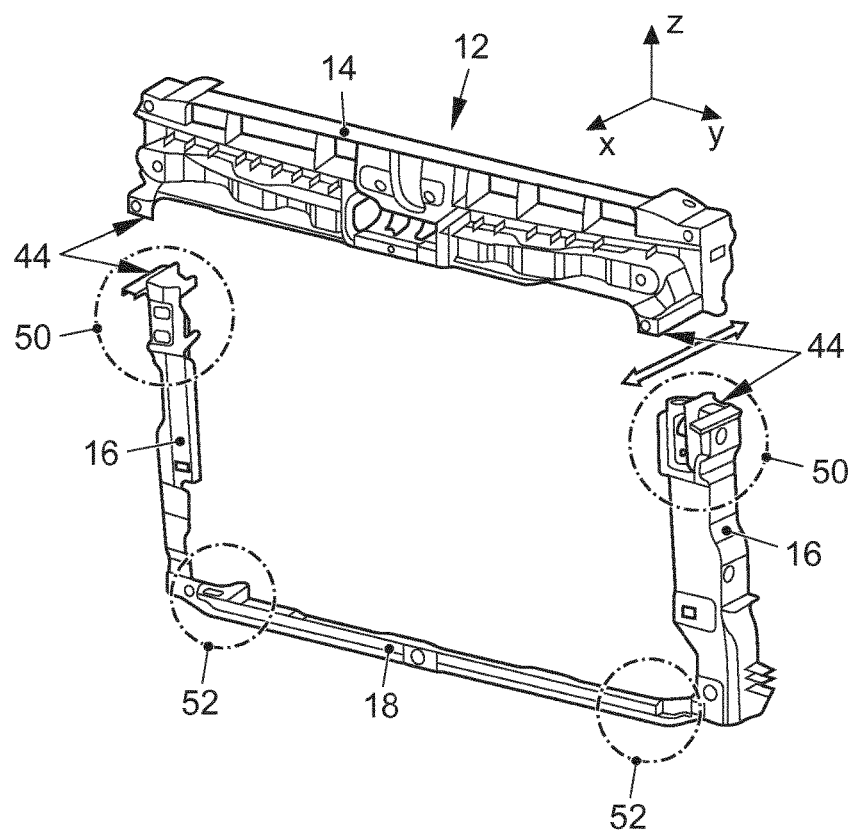
FIG. 10 shows another specific embodiment of a mounting support according to the invention, including a separate upper part and a separate lower part, which may be variably arranged with respect to each other in the longitudinal direction.

FIG. 10 shows another specific embodiment of a mounting support 12, with the aid of which the relative arrangement of a radiator module 20 to mounting support 12 may be varied in the vehicle longitudinal direction (x direction). In this mounting support 12, upper cross member 14 is manufactured as a separate element and forms a first part of the frame. Vertical members 16 and lower cross member 18 are also manufactured as a separate element and form a second part of the frame. The second part of the frame may be provided in at least two different arrangements relative to the first part, the two arrangements differing from each other due to the relative position in the x direction. As a result, the relative position of a radiator module 20 to mounting support 12, in particular to upper cross member 14 of mounting support 12, may be varied. The variable connecting areas between the first part and the second part may be viewed here as adapter elements 44. An adjustability in the x direction by the thickness of one or multiple radiator layers is preferably provided.

In all illustrated and described specific embodiments, mounting support 12 is manufactured from plastic by plastic injection molding. Adapter elements 44 are also preferably manufactured from plastic, since this is associated with low manufacturing costs, in particular at high volumes, and also with a low component weight. Other materials, in particular fiber-reinforced plastics, steel or aluminum, are also usable for mounting support 12, adapter elements 44 or other elements.

An elastic material, preferably an elastomer material, is used for radiator bearings 26, 28 having bearing receiving openings 36, in particular in the area of the bearing receiving openings.

The features of the invention disclosed in the present description, in the drawing and in the claims may be essential to implementing the invention in its various specific embodiments, both individually and in any combination. The invention is not limited to the described specific embodiments. it may be varied within the scope of the claims and taking into account the knowledge of the competent person skilled in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A series of mounting supports for fastening radiator modules in a front end of a motor vehicle, each of the mounting supports comprising:
    a frame, which includes an upper cross member, two lateral vertical members and a lower cross member;
    at least one upper bearing area for mounting a radiator module;

at least one lower bearing area for mounting a radiator module arranged on the frame; and at least two adapter elements arranged on the mounting support in the upper bearing area and in the lower bearing area for establishing a connection between the mounting support and a radiator module, the at least two adapter elements facilitating a fastening of the radiator modules in different relative positions to the mounting support, wherein one adapter element of the at least two adapter elements that is arranged in the upper bearing area is latched to an inner side surface of one of the two vertical members.

2. The series of mounting supports according to claim 1, wherein the at least two adapter elements are separately manufactured elements and are connected to the mounting support in a form-fitting, force-fitting or integral manner.

3. The series of mounting supports according to claim 1, wherein radiator bearings of different lengths, which are connectable to the mounting support, are provided as the at least two adapter elements for different arrangements.

4. The series of mounting supports according to claim 1, wherein radiator bearings, which have at least two bearing receiving openings, or radiator bearings having different bearing receiving opening arrangements, which are connectable to the mounting support by insertion into openings, are provided as the at least two adapter elements for different arrangements.

5. The series of mounting supports according to claim 1, wherein radiator bearings are provided as the at least two adapter elements and have a length of at least 50 mm in the upper bearing area and/or in the lower bearing area.

6. The series of mounting supports according to claim 1, wherein at least one recess, which has at least one constriction, is formed in the lower cross member for accommodating a radiator bearing serving as an adapter element of the at least two adapter elements.

7. The series of mounting supports according to claim 1, wherein at least one adapter element of the at least two adapter elements is situated to at least partially overlap one of the two vertical members of the mounting support viewed in a vertical direction and in a transverse direction.

8. The series of mounting supports according to claim 1, wherein the one adapter element of the at least two adapter elements that is arranged in the upper bearing area includes two latching hooks to latch to the inner side surface of the one of the two vertical members.

9. The series of mounting supports according to claim 1, wherein one adapter element of the at least two adapter elements that is arranged in the lower bearing area includes at least one bearing receiving opening, and wherein a peripheral wall surrounds the at least one bearing receiving opening, the peripheral wall being inserted into a corresponding opening of the frame.

10. A mounting support for fastening radiator modules, the mounting support comprising;

a frame, which includes an upper cross member, two lateral vertical members, and a lower cross member;

at least one upper bearing area for mounting a radiator module; and at least one lower bearing area for indirectly mounting or directly mounting a radiator module being arranged on the frame, wherein the at least one upper bearing area is arranged on the frame as a removable adapter element of the frame, wherein the removable adapter element is inserted into a recess provided in one of the two vertical members, wherein, once inserted into the recess, the removable adapter element is arranged entirely or almost entirely within the one of the two vertical members, and wherein the removable adapter element includes a bearing housing and a bearing element arranged within the bearing housing, the bearing element being formed of an elastic material.

11. The mounting support according to claim 10, wherein the upper cross member is manufactured as a separate element and forms a first part of the frame, wherein the two vertical members and the lower cross member form a second part of the frame, wherein the second part is connectable to the first part in at least two different relative positions, viewed in a vehicle longitudinal direction, or wherein the second part is movably arranged relative to the first part in the longitudinal direction.

12. A series of mounting supports for fastening radiator modules in a front end of a motor vehicle, each of the mounting supports comprising:

a frame, which includes an upper cross member, two lateral vertical members and a lower cross member;

at least one upper bearing area for mounting a radiator module;

at least one lower bearing area for mounting a radiator module arranged on the frame; and at least two adapter elements arrangeable interchangeably on the mounting support in the upper bearing area for establishing a connection between the mounting support and a radiator module, the at least two adapter elements each having a different geometry, such that the at least two adapter elements facilitate a fastening of the radiator modules in different relative positions to the mounting support.

13. The series of mounting supports according to claim 12, wherein the at least two adapter elements are removably insertable into a recess provided in one of the two vertical members, respectively.

* * * * *